United States Patent [19]

Judge

[11] Patent Number: 5,057,910
[45] Date of Patent: Oct. 15, 1991

[54] METHOD OF DISPLAYING VIDEO SIGNAL PHASE CHARACTERISTICS

[75] Inventor: John L. Judge, Hillsboro, Oreg.

[73] Assignee: Magni Systems, Inc., Beaverton, Oreg.

[21] Appl. No.: 487,463

[22] Filed: Mar. 1, 1990

Related U.S. Application Data

[60] Division of Ser. No. 285,775, Dec. 16, 1988, Pat. No. 4,941,035, which is a continuation-in-part of Ser. No. 17,314, Feb. 20, 1987, Pat. No. 4,792,845.

[51] Int. Cl.[5] .......................................... H04N 17/02
[52] U.S. Cl. .................................... 358/10; 324/83 R
[58] Field of Search ............... 358/10; 324/83 R, 88, 324/121

[56]  References Cited

U.S. PATENT DOCUMENTS

| | | | |
|---|---|---|---|
| 2,447,502 | 8/1948 | Hardy | 324/88 |
| 3,129,283 | 4/1964 | Tarantur | 358/10 |
| 3,602,644 | 8/1971 | Rognon | 324/121 R |
| 4,388,637 | 6/1983 | Blair | 358/10 |
| 4,454,530 | 6/1984 | Yoshinaka et al. | 358/10 |
| 4,518,986 | 5/1985 | Hinn et al. | 358/10 |
| 4,694,324 | 9/1987 | Matney | 358/10 |
| 4,754,329 | 6/1988 | Lindsay et al. | 324/121 R |

Primary Examiner—John W. Shepperd
Attorney, Agent, or Firm—Stoel Rives Boley Jones & Grey

[57]  ABSTRACT

A method of displaying phase characteristics of a video signal is employed in a system that determines the phase angle between the color synchronization burst signal and horizontal synchronization pulses of a color video signal. The method includes selecting an image location on a display screen of video monitor and forming at the image location an image representing the value of the phase angle. The image is formed with a length along one axis passing through the image location and with a light intensity. One of the length or the light intensity is proportional to the value of the phase angle to provide an indication of the value.

13 Claims, 8 Drawing Sheets

METHOD OF DISPLAYING VIDEO SIGNAL PHASE CHARACTERISTICS

This is a division of application No. 07/285,775, filed Dec. 16, 1988, which is now U.S. Pat. No. 4,941,035 which is a continuation-in-part of U.S. patent application Ser. No. 07/017,314, filed Feb. 20, 1987 now U.S. Pat. No. 4,792,845.

TECHNICAL FIELD

The present invention relates to systems for processing color video signals and, in particular, to a system that measures the phase relationship between the color synchronization burst signal and the horizontal synchronization pulse of a color video signal.

BACKGROUND OF THE INVENTION

The EIA RS-170A tentative standard (1977) for NTSC-based television systems sets the period of the horizontal synchronization pulse train at 227.5 times that of the color subcarrier signal. Since an integer relationship does not exist between the periods of these signals, the phase angle between the color subcarrier and horizontal synchronization pulse train shifts by 180° for each successive horizontal scan line. Moreover, since 525 horizontal scan lines define a color frame (i.e., two color fields), the phase angle between the color subcarrier and the horizontal synchronization pulse train also shifts by 180° for each successive color frame. The NTSC-based color television standard establishes, therefore, a two-color frame (i.e., four-color field) sequence of phase angles between the color subcarrier and the horizontal synchronization pulse train.

The editing of a single video signal or the multiplexing of multiple asynchronous video signals requires the synchronization or matching of the phase angle sequences of the components of the resulting composite video signal to provide a continuous series of video images with smooth transitions between them. The absence of matching of the phase angle sequences in, for example, a video tape recorder (VTR) can create problems that manifest themselves in the following ways. Whenever there is a mismatch between the color frame sequence of a color video signal being edited and the timing sequence of the color video reference signal in the VTR, the recording of the color video signal could be delayed or might not take place at all. Whenever there is a phase difference between successive color subcarrier signals of the color video signals provided by separate signal sources during a multiplexing operation, there could occur a momentary shift in color at the time the signals are switched. Whenever the phases of the color subcarrier signals are the same but the color frame sequences are mismatched, there could occur a horizontal jump in the picture at the time the signals are switched.

The maintenance of the proper phase angle between the color subcarrier and horizontal synchronization pulse train of a color video reference signal is important to the operation of a television studio. A phase angle offset could cause similar offsets in equipment receiving the reference signal, thereby resulting in any one of the video signal processing errors described hereinabove. The phase and frequency of the color subcarrier signal are the same as those of the color synchronization burst signal, which is located on the back porch of a horizontal blanking pulse. The phase angle between the color subcarrier and the horizontal synchronization pulse can be determined, therefore, by measuring with a phase detector the phase angle between the color synchronization burst signal and the horizontal synchronization pulse.

A phase detector of conventional design employs a phase-locked loop (PLL), which phase locks the output signal of a voltage-controlled oscillator to the horizontal synchronization pulse. A determination of the phase relationship between the color synchronization burst and voltage-controlled oscillator output signal provides an indication of the phase angle between the color synchronization burst and the horizontal synchronization pulse. Since it must operate in the presence of jitter or phase noise on the color video signal, a PLL is typically designed to have a relatively large acquisition time that would make difficult the phase measurement of horizontal synchronization pulses in consecutive scan lines.

SUMMARY OF THE INVENTION

An object of the present invention is, therefore, to provide a simplified phase detector for measuring the phase relationship between the color synchronization burst signal and horizontal synchronization pulses of a color video signal.

Another object of this invention is to provide such a phase detector that is operable to continuously measure the phase angles between the color subcarrier and successive pulses in the horizontal synchronization pulse train of a color video signal.

A further object of this invention is to provide such a phase detector that indicates whether the color frame sequences of two color video signals are matched.

The present invention constitutes a method and electrical circuit for determining the phase relationship between the color synchronization burst signal and horizontal synchronization pulses of a color video signal. This is accomplished by regenerating on a line-by-line basis a color subcarrier signal which has a fixed phase relative to the leading edge of a horizontal synchronization pulse. A phase comparison is then made between the regenerated color subcarrier signal and the color synchronization burst signal to develop a signal that represents the amount of phase error. The phase error signal is sampled to determine an average phase error for successive lines of the color video signal.

Simultaneously, a phase comparison is also made between a 90° phase-displaced version of the color synchronization burst signal and the regenerated color subcarrier signal to provide a quadrature phase error signal. The quadrature phase error signal can be compared to a color video reference signal to determine whether they have the same color frame.

The phase error signal is applied to the X-axis of an X-Y display device so that the amount of deflection in the X direction indicates the amount of phase error. A dot at a reference location (e.g., the center of the display screen) indicates no phase error. A line image of increasing length deflected up or down by an increasing amount relative to the reference location indicates either positive or negative phase error of increasing amount. Color frame mismatch between two signals is displayed by flashing the dot or line image at a 1 Hz rate.

Additional objects and advantages of the present invention will be apparent from the following detailed description of a preferred embodiment thereof, which proceeds with reference to the accompanying drawings.

DETAILED DESCRIPTION OF PREFERRED EMBODIMENT

Figure 1:
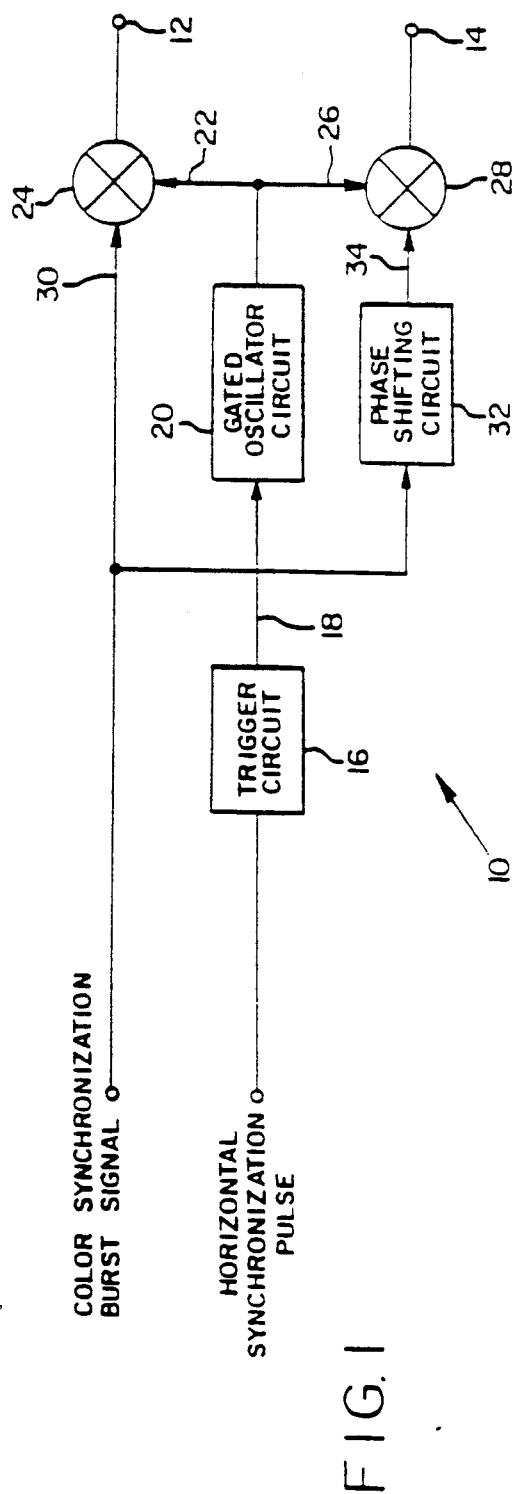
FIG. 1 is a block diagram of signal processing components of the color video signal phase detector of the present invention.

With reference to FIG. 1, color video signal phase detector 10 of the present invention provides at its output terminals 12 and 14 complementary (i.e., 90° phase-displaced) analog voltage signals whose amplitudes indicate the phase angle between the color synchronization burst signal and a horizontal synchronization pulse of a color video signal. The horizontal synchronization pulse is applied to a voltage threshold detection or trigger circuit 16, which generates at its output 18 a trigger signal whenever the leading edge of the pulse crosses a threshold voltage whose level is set in the manner described below. The trigger signal is applied to and activates a gated oscillator circuit 20, which provides a reference subcarrier signal to a first input 22 of a first mixer circuit 24 and a first input 26 of a second mixer circuit 28. The frequency of the reference subcarrier signal is preferably equal to, but can be within about 15 KHz of, the nominal 3.58 MHz frequency of the color subcarrier signal. The phase of the reference subcarrier signal is fixed relative to the voltage threshold level of the leading edge of the horizontal synchronization pulse.

The color synchronization burst signal is applied to a second input 30 of first mixer circuit 24, which mixes the reference subcarrier signal and the color synchronization burst signal to provide at output 12 a first output signal whose amplitude represents the sine of the phase angle between the reference subcarrier and color synchronization burst signals. Since the reference subcarrier signal has a fixed phase relative to the horizontal synchronization pulse, the amplitude of the first output signal corresponds to the phase angle between the color synchronization burst signal and the horizontal synchronization pulse.

A phase shifting circuit 32 receives the color synchronization burst signal and provides a 90° phase-displaced version thereof to a second input 34 of second mixer circuit 28. Mixer circuit 28 mixes the 90° phase-displaced color synchronization burst signal and the reference subcarrier signal to provide at output 14 a second output signal whose amplitude represents the value of the cosine of the phase angle between the phase-displaced color synchronization burst and reference subcarrier signals. The second output signal corresponds to the complementary function of the phase angle between the color synchronization burst signal and the horizontal synchronization pulse. The first and second output signals provide on the respective output terminals 12 and 14, therefore, a complete determination of the phase angle between the color synchronization burst signal and the horizontal synchronization pulse.

The frequency difference between the 3.58 MHz color synchronization burst signal and the reference subcarrier signal is not critical to the operation of phase detector 10. The reason is that the color synchronization burst signal is of 2.5 microsecond duration, which, for example, represents about 1/26 of one cycle of a beat frequency signal of 15 KHz present at the output terminals 12 and 14 of the respective mixers 22 and 28. The frequency of the reference subcarrier signal can, therefore, vary about ±15 KHz and not affect the performance of phase detector 10. The output signals appearing on output terminals 12 and 14 are essentially DC voltage levels.

Figure 2:
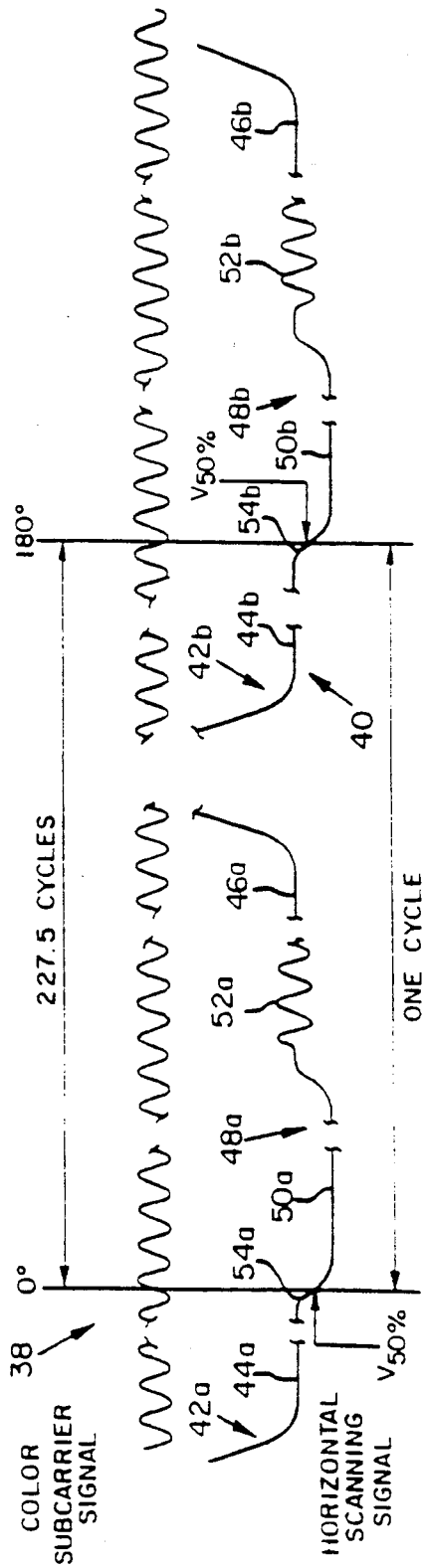
FIG. 2 is a diagram showing NTSC-type color subcarrier signal and horizontal synchronization pulse train waveforms.

FIG. 2 shows the timing relationship between a color subcarrier signal 38 and a horizontal synchronization pulse train 40 of an NTSC-based color video signal. FIG. 2 depicts only two successive horizontal blanking pulses 42a and 42b and indicates the 227.5-to-1 frequency relationship between the color subcarrier signal and the horizontal synchronization pulse train. Horizontal blanking pulses 42a and 42b have similar signal components identified by identical reference numerals and lower case suffixes corresponding to the pertinent blanking pulse. The following description is directed only to horizontal blanking pulse 42a.

Horizontal blanking pulse 42a includes a front porch portion 44a and a back porch portion 46a, which are separated by a horizontal synchronization pulse 48a having a tip portion 50a. A color synchronization burst signal 52a having the same phase and frequency as those of color subcarrier signal 38 is located on back porch portion 46a of horizontal blanking pulse 42a. A leading edge transition 54a occurs between front porch portion 44a and tip portion 50a. The voltage level located precisely midway along leading edge 54a is defined as a transition or reference voltage $V_{50\%}$.

The phase angle between color subcarrier signal 38 and horizontal synchronization pulse 48a is measured relative to the reference voltage $V_{50\%}$ and is 0°. As a consequence of the 227.5-to-1 frequency relationship between color subcarrier signal 38 and horizontal synchronization pulse train 40, the phase angle between color subcarrier signal 38 and the next succeeding horizontal synchronization pulse 48b would be 180°. Since color synchronization burst signal 52a has the same phase and frequency as those of color subcarrier signal 38, the phase angle between color synchronization burst signal 52a and horizontal synchronization pulse 48a is 0° and the phase angle between color synchronization burst signal 52b and horizontal synchronization pulse 48b is 180°.

Figure 3A:
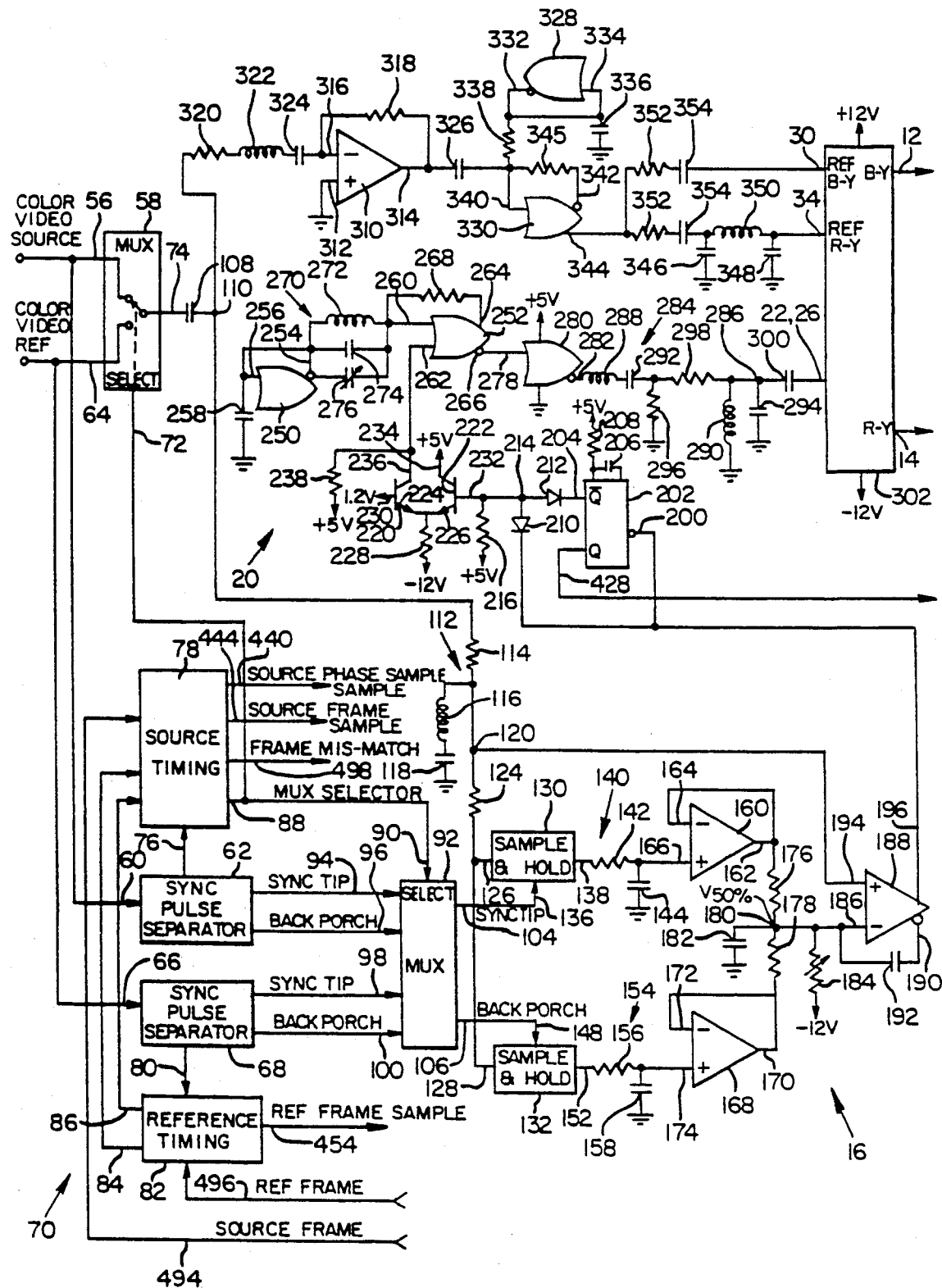
FIGS. 3A and 3B show a schematic electrical circuit diagram of a preferred embodiment of the color video signal phase detector circuit of the present invention.
Figure 3B:
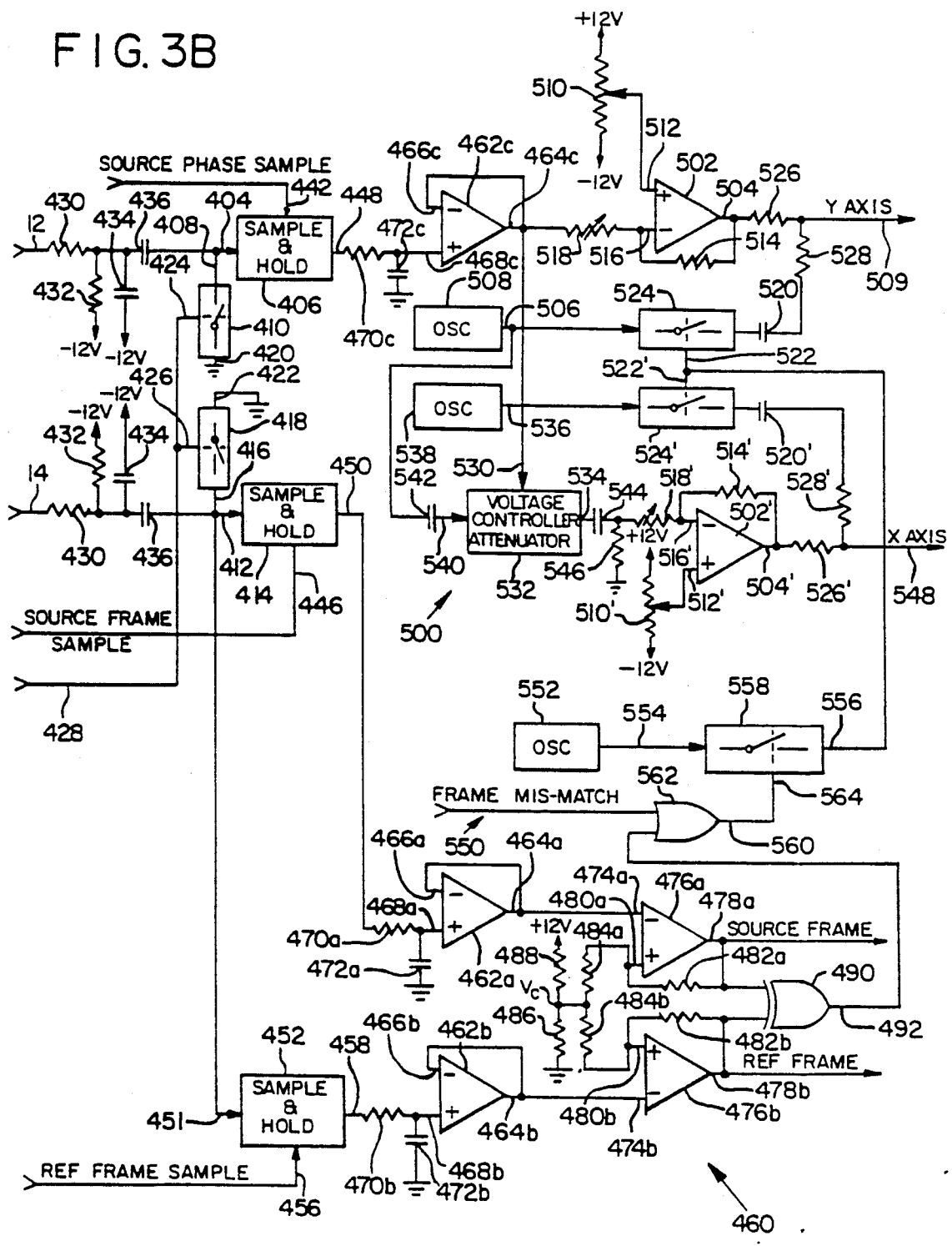

FIGS. 3A and 3B show an electrical circuit schematic diagram of phase detector 10, which, unless otherwise indicated, employs logic circuitry of the TTL type. Phase detector 10 receives a color video source signal, which represents, for example, a signal to be edited, and a color video reference signal, which represents a television studio reference signal. The video source signal is applied to an input 56 of a multiplexer 58 and to an input 60 of a first synchronization pulse separating circuit 62, and the video reference signal is applied to an input 64 of multiplexer 58 and to an input 66 of a second synchronization pulse separating circuit 68. Pulse separating circuits 62 and 68 comprise part of a timing circuit 70 which develops a multiplexer selector signal that is applied to the select input 72 of multiplexer 58 to provide at its output 74 one of the two signals applied to the inputs 56 and 64 thereof. The criteria for selecting these signals are set forth below.

First pulse separating circuit 62 receives the color video source signal and provides to an input 76 of a first or source timing subcircuit 78 the composite synchronization signal, which includes the horizontal synchronization signal, the vertical synchronization signal, and the equalizing pulses of the color video source signal. Second pulse separating circuit 68 receives the color video reference signal and provides to an input 80 of a second or reference timing subcircuit 82 the composite synchronization signal, which includes the horizontal synchronization signal, the vertical synchronization signal, and the equalizing pulses of the color video reference signal.

Timing subcircuit 82 provides at outputs 84 and 86 the timing signals corresponding to the starting points of each color frame and of each color field, respectively, of the color video reference signal. Timing subcircuit 78 receives the timing signals provided on outputs 84 and 86 of timing subcircuit 82 and develops the multiplexer selector signal on an output 88. The multiplexer selector signal is applied to select input 72 of multiplexer 58 to alternately provide at its output 74 the color video source signal and the color video reference signal. The selector signal in a first logic state provides the color video source signal on output 74 of multiplexer 58. The selector signal in a second logic state provides the color video reference signal on output 74 of multiplexer 58.

Skilled persons would appreciate that because NTSC-based color video signals employ a four-color field sequence, it is critical that the samples of the color video source and reference signals correspond to the appropriate color field within the sequence. The first and second logic states of the multiplexer selector signal cause the signals applied to the respective inputs 56 and 64 of multiplexer 58 to appear on its output 74 in a manner that provides a maximum amount of time for the circuit components of phase detector 10 to settle before the sampling of the next succeeding signal. The selector input 90 of multiplexer 92 also receives the multiplexer selector signal from output 88 of timing subcircuit 78 and, therefore, operates in synchronism with multiplexer 58.

Pulse separating circuit 62 provides to inputs 94 and 96 of multiplexer 92 the tip portion of the horizontal synchronization pulse and the back porch portion of the horizontal blanking pulse, respectively, of the color video source signal. Similarly, pulse separating circuit 68 provides to inputs 98 and 100 of multiplexer 92 the tip portion of the horizontal synchronization pulse and the back porch portion of the horizontal blanking pulse, respectively, of the color video reference signal. Whenever select input 90 of multiplexer 92 receives the multiplexer selector signal in the first logic state, multiplexer 92 transmits to its outputs 104 and 106 the tip portion of the horizontal synchronization pulse and the back porch portion of the horizontal blanking pulse, respectively, of the color video source signal. Whenever select input 90 of multiplexer 92 receives the select signal in the second logic state, multiplexer 92 transmits to outputs 104 and 106 the respective tip portion of the horizontal synchronization pulse and the back porch portion of the horizontal blanking pulse, respectively, of the color video reference signal. The signals appearing on the outputs of multiplexers 58 and 92 are processed by voltage threshold detection circuit 16 in the following manner. For purposes of illustration only, the following descriptions of the operation of detection circuit 16 and gated oscillator 20 are directed to the processing of the color video source signal, i.e., when the multiplexer selector signal on output 88 of timing subcircuit 78 is in the first logic state. It will be appreciated that the following description is also applicable to the processing of the color video reference signal.

Whenever the multiplexer selector signal in the first logic state is applied to its select input 72, multiplexer 58 delivers the color video source signal to its output 74 to which a capacitor 108 of 100 $\mu f$ is connected. Capacitor 108 blocks the DC component of the color video source signal and delivers the remaining signal components to the input node 110 of a bandstop or trap circuit 112 of the resistor-inductor-capacitor (RLC) type, which is tuned to about 3.58 MHz and removes the 3.58 MHz color subcarrier signal from the color video source signal. RLC trap circuit 112 comprises a resistor 114 of 120 ohms, an inductor 116 of 15 $\mu H$, and a capacitor 118 of 130 pf, the last two of which are connected in series to ground. Removing the color subcarrier signal from the color video source signal provides a monochrome video signal on output node 120, which constitutes the input terminal of voltage threshold detection circuit 16.

The monochrome video signal is transmitted through an input resistor 124 of 100 ohms to the analog inputs 126 and 128 of respective sample-and-hold circuits 130 and 132. Simultaneously, in response to the multiplexer selector signal in the first logic state provided to select input 90, multiplexer 92 transmits on outputs 104 and 106 the tip portion of the horizontal synchronization pulse and the back porch portion, respectively, of the color video source signal. The tip portion of the horizontal synchronization pulse is applied to an enable input 136 of sample-and-hold circuit 130. Since multiplexers 58 and 92 operate in synchronism, sample-and-hold circuit 130 samples the voltage of the tip portion of the horizontal synchronization pulse. Output 138 of sample-and-hold circuit 130 provides the voltage of the tip portion to a low pass filter 140 that comprises a resistor 142 of 100 ohms and a capacitor 144 of 0.001 $\mu f$, which is connected to ground. Low pass filter 140 removes high frequency switching transient voltages from the sampled voltage of the tip portion of the color video source signal. The back porch portion of the horizontal blanking pulse is applied to an enable input 148 of sample-and-hold circuit 132. Since multiplexers 58 and 92 operate in synchronism, sample-and-hold circuit 132 samples the voltage of the back porch portion of the horizontal blanking pulse. Output 152 of sample-and-hold circuit 132 provides the voltage of the back porch portion to a low pass filter 154 whose resistor 156 and capacitor 158 values are similar to those and whose operation is analogous to that of low pass filter 140.

An operational amplifier 160 configured with its output 162 connected to its inverting input 164 forms a voltage follower buffer amplifier, the noninverting input 166 of which receives from low pass filter 140 the voltage of the tip portion of the horizontal synchronization pulse and which provides a buffered version thereof on its output 162. An operational amplifier 168 configured with its output 170 connected to its inverting input 172 forms a voltage follower buffer amplifier, the noninverting input 174 of which receives from low pass filter 154 the voltage of the back porch portion of the horizontal blanking pulse and which provides a buffered version thereof on its output 170. Operational amplifiers 160 and 168 are preferably low-noise general purpose BiFET operational amplifiers of the TL071C-type.

Two-1 kilohm resistors 176 and 178 are connected in series between output 162 of amplifier 160 and output 170 of amplifier 168, respectively. Resistors 176 and 178 form a voltage divider that provides on a circuit node 180 the reference voltage $V_{50\%}$, which is precisely midway between the voltage level of the tip portion of the horizontal synchronization pulse and that of the back porch portion of the horizontal blanking pulse. A capacitor 182 of 0.01 $\mu$f connected between circuit node 180 and ground removes any noise voltage components from the reference voltage $V_{50\%}$. A variable resistor 184 of maximum resistance of 1.3 megohms that is connected between circuit node 180 and a $-12$ volt DC bias supply provides adjustable compensation for voltage offset differences between operational amplifiers 160 and 168 and the input offset voltage of a voltage comparator 188, whose inverting input 186 is connected to circuit node 180.

The reference voltage $V_{50\%}$ on circuit node 180 is applied to the inverting input 186 of voltage comparator 188. A stabilizing feedback capacitor 192 of 3 pf is connected between the inverting output 190 and the inverting input 186 of comparator 188. The monochrome video signal present at circuit node 120 is applied to the noninverting input 194 of comparator 188. Whenever the voltage of the leading edge of the monochrome video signal crosses the reference voltage $V_{50\%}$, a negative-going trigger pulse appears at the noninverting output 196 of comparator 188. Detection circuit 16 provides a trigger pulse indicating within less that one percent error relative to the amplitude of the horizontal synchronization pulse the time at which the horizontal synchronization pulse crosses the reference voltage $V_{50\%}$. Such accuracy is necessary in that a voltage offset corresponding to 10% of the amplitude of the horizontal synchronization pulse (i.e., approximately 30 mV) would generate an error of approximately 30° in the determination of the phase angle between the color synchronization burst signal and horizontal synchronization pulse.

Output 196 of comparator 188 is applied to the negative edge trigger input 200 of a monostable multivibrator or one-shot 202, which "stretches" or lengthens the duration of the trigger pulse. The negative-going edge of the trigger pulse applied to input 200 of one-shot 202 causes a negative-going pulse of approximately 9 microseconds in duration to develop on the $\overline{Q}$ output 204 of one-shot 202. The 9 microsecond duration is determined by a timing capacitor 206 of 0.001 $\mu$f and a timing resistor 208 of 20 kilohms. Timing capacitor 206 and timing resistor 208 are connected to one-shot 202 in accordance with the device manufacturer's applications instructions. One-shot 202 can be, for example, one portion of a 96LS02 device.

A pair of diodes 210 and 212, whose anode terminals are connected together at a circuit node 214, and a resistor 216 of 10 kilohms, which is connected to a bias voltage of $+5$ volts, form a diode-OR gate circuit. The cathode terminal of diode 210 and the cathode terminal of diode 212 are connected to output 196 of comparator 188 and $\overline{Q}$ output 204 of one-shot 202, respectively. Applying the trigger pulse from output 196 of comparator 188 ensures that the trigger pulse reaches node 214 with a minimum delay time. This is accomplished by effectively bypassing the propagation delay of one-shot 202. The pulse of 9 microsecond duration provided by one-shot 202 encompasses the transmission time of the color synchronization burst signal of the color video source signal.

A pair of emitter-coupled NPN transistors 220 and 222 of the 2N3904 type functions as a comparator circuit that provides an enable signal to gated oscillator 20 in response to the trigger pulse on circuit node 214. This comparator functions as an interface between the logic circuitry of the TTL type, which develops the trigger pulse, and of the ECL type, which develops the output signal of gated oscillator 20. The emitter terminals 224 and 226 of the respective transistors 220 and 222 are connected through a resistor 228 of 3.3 kilohms to a bias voltage of $-12$ volts. The base terminal 230 of transistor 220 constitutes the comparator reference input, to which $+1.2$ volts is applied. The base terminal 232 of transistor 222 receives the trigger pulse signal on circuit node 214.

Whenever the signal on circuit node 214 is in a logic 1 state (i.e., $+3.2$ volts), a greater amount of current flows through the collector terminal 234 of transistor 222 than flows through collector terminal 236 of transistor 220. Under these conditions, the voltage on collector terminal 236 of transistor 220 is about $+5$ volts. Whenever the signal on circuit node 214 is in a logic 0 state (i.e., $+0.4$ volts), a greater amount of current flows through collector terminal 236 of transistor 220 than flows through collector terminal 234 of transistor 222. Under these conditions, the voltage on collector terminal 236 of transistor 220 is about $+0.5$ volt. Collector terminal 234 is connected directly to the $+5$ volt supply, and collector terminal 236 is connected through resistor 238 of 680 ohms to the $+5$ volt supply. The voltage on collector terminal 236 of transistor 220 functions as the enable signal for gated oscillator 20 in the following manner.

Gated oscillator 20 includes two gates 250 and 252 of the emitter-coupled logic (ECL) family that provide a generally square wave output signal of about 3.58 MHz. The ECL logic gates are useful because they are relatively high speed switching devices and can be biased into a linear mode to function as an amplifier. Logic gate 250 is configured as an inverter whose output 254 and input 256 are connected together. A capacitor 258 of 0.1 $\mu$f connected from input 256 of inverter 250 to ground prevents inverter 250 from oscillating, thereby developing on its output 254 a voltage of about $+3.6$ volts, which represents the switching threshold voltage of inverter 250. Logic gate 252 has two inputs 260 and 262 and two outputs 264 and 266, with output 264 representing that of an OR gate and output 266 representing that of a NOR gate. A feedback resistor 268 of 1.8 kilohms connected between output 264 and input 260 provides a positive feedback path around logic gate 252. Logic gate 252 functions as an oscillator that is tuned to the 3.58 MHz frequency set by a parallel resonant circuit 270, which comprises an inductor 272 of 15 µH, a temperature-compensating type capacitor 274 of 120 pf, and a variable capacitor 276 of 2 pf to 10 pf. Resonant circuit 270 is connected between output 254 of inverter 250 and input 260 of logic gate 252 to provide a DC voltage signal path through inductor 272 to bias logic gate 252 to its linear region and thereby allow it to oscillate at the 3.58 MHz frequency.

Input 262 of logic gate 252 receives the voltage on collector terminal 236 of transistor 220. Whenever the voltage on input 262 of logic gate 252 is +5 volts, which corresponds to a logic 1 state of the trigger pulse, output 266 of logic gate 252 remains in the logic 0 state. Whenever the voltage on input 262 of logic gate 252 is +0.5 volt, which corresponds to a logic 0 state of the trigger pulse, output 266 of logic gate 252 oscillates at about 3.58 MHz. The oscillation begins with a transition from the logic 0 state to the logic 1 state in response to the negative-going edge of the trigger signal and lasts for approximately the 9 microsecond duration of the trigger pulse.

Output 266 of logic gate 252 is applied to the input 278 of an inverter 280, whose output 282 is applied to the input of a bandpass filter 284, which provides a 3.58 MHz sinusoidal "regenerated" subcarrier signal on an output terminal 286. Bandpass filter 284 includes inductors 288 and 290, each of 15 µH; capacitors 292 and 294, each of 130 pf; a resistor 296 of 330 ohms; and a resistor 298 of 2 kilohms in the configuration shown in FIG. 3. The signal on output terminal 286 of a bandpass filter 284 is a pulsed sinusoidal waveform that appears in response to the transition of the horizontal synchronization pulse across the reference voltage $V_{50\%}$. This signal is applied through an AC coupling capacitor 300 of 10 µf to inputs 22 and 26 of the respective mixers 24 and 28, which comprise part of a chroma demodulator integrated circuit 302 whose operation will be described below. Gated oscillator 20 provides, therefore, a gated sinusoidal waveform that begins in a known, predictable phase relationship with the trigger pulse that initiates the oscillation. During the 9 microsecond time interval gated oscillator 20 develops the regenerated subcarrier signal on output terminal 286 of bandpass filter 284, the color synchronization burst signal of the color video source appears on circuit node 110 and is amplified by an amplifier 310, which is constructed from discrete components in a known manner. Amplifier 310 is configured in the inverting mode with its noninverting input 312 connected to ground and its output 314 fed back to its inverting input 316 through a feedback resistor 318 of 2.7 kilohms. A resistor 320 of 301 ohms, which is connected between circuit node 110 and inverting input 316, together with resistor 318 sets the gain of operational amplifier 310. An inductor 322 of 15 µH and a capacitor 324 of 130 pf are connected in series with resistor 320 and form a bandpass filter that resonates at about 3.58 MHz to pass the color synchronization burst signal through amplifier 310 at full gain.

The amplified color synchronization burst signal is DC coupled through a capacitor 326 of 0.1 µf to a pair of logic gates 328 and 330 that function as a limiter which restricts the peak-to-peak amplitude of the color synchronization burst signal to about one volt. Logic gate 328 is an inverter with its output 332 connected to its input 334, which is connected to ground through a capacitor 336 of 0.1 µf. Inverter 328 functions in a manner analogous to that of inverter 250 to deliver a +3.6 volt bias through a resistor 338 of 10 kilohms to the input 340 of logic gate 330. Logic gate 330 has two outputs 342 and 344, with output 342 representing that of an inverter and output 344 representing that of a noninverting buffer.

A resistor 345 of 3 kilohms connected between output 342 and input 340 provides a negative feedback path around logic gate 330. Logic gate 330 functions as a negative feedback amplifier which is biased in the linear region by the +3.6 volts developed by inverter 328 and whose output is limited to one volt peak-to-peak by the permissible output voltage swing of the logic gate. Each of the ECL logic gates 250, 252, 280, 328, and 330 can be a 10H105 or equivalent device and employs pull down resistors (not shown) as recommended by the manufacturer. The power supply is operated from 0 to +5 volts, rather than from 0 to −5.2 volts as recommended by the manufacturer, to allow for easier interfacing to the trigger pulse input and to manage the instrument power consumption.

The synchronization burst signal on output 344 of logic gate 330 is divided into two-90° phase-displaced signals that are delivered to input 30 of mixer 24 and input 34 of mixer 28. As was stated above, mixers 24 and 28 comprise part of demodulator circuit 302. A pi-section filter comprised of capacitors 346 and 348, each of 390 pf, and an inductor 350 of 4.7 µH provides the 90° phase shift of the signal applied to input 34 of mixer 28 relative to that applied to input 30 of mixer 24. Each of the 90° phase-displaced signals is isolated from the other and is AC coupled by series-connected resistor 352 of 100 ohms and capacitor 354 of 0.1 µf.

Demodulator circuit 302 is a chroma demodulator integrated circuit, such as a CA3072 device manufactured by RCA or a LM1848 manufactured by National Semiconductor. Demodulator circuit 302 receives a composite video signal and a reference subcarrier and generates the R-Y and B-Y decoded output signals from them. In particular, demodulator 302 receives the two-90° phase-displaced signals applied to its inputs 30 and 34 and the regenerated color subcarrier signal applied to its inputs 22 and 26 and develops on its R-Y output 14 and B-Y output 12 two-90° phase-displaced signals representing the amplitude and phase relationships of the input signals. Since the amplitude of each input signal is fixed by ECL logic gates, the voltage signals on outputs 12 and 14 represent only the phase relationship of the input signals.

Capacitor 276 is adjusted so that the frequency of oscillation of logic gate 252 causes a zero error voltage at B-Y output 12 when a color synchronization burst signal and a horizontal synchronization pulse are applied in the correct phase relationship to phase detector 10. Similarly, R-Y output 14 of demodulator 302 will provide a maximum positive voltage level for even numbered lines of field 1 and field 4 and odd numbered lines of field 2 and field 3. Changing the phase between the color synchronization burst signal and the horizontal synchronization pulse over 360° generates an error voltage on B-Y output 12 to vary as a function of the sine and the R-Y error voltage to vary as a function of the cosine of the phase difference between such signals. In sum, the B-Y signal on output 12 indicates the amount of phase error, and the R-Y signal on output 14 indicates which of the two 180° parts of the phase circle the phase error is present. Comparison of the voltage of the R-Y signal generated by the video reference signal and that generated by the video source signal indicates whether such signals are in the same color frame. The comparison of the video source signal and video reference signal is accomplished in the following manner.

The B-Y output 12 of demodulator 302 is applied to the analog input 404 of a sample-and-hold circuit 406 and an electrical contact 408 of a "normally closed" electronic relay 410, and the R-Y output 14 of demodulator 302 is applied to the analog input 412 of a sample-and-hold circuit 414 and an electrical contact 416 of a "normally closed" electronic relay 418. Electrical contacts 420 and 422 of the respective relays 410 and 418 are connected to ground, and control inputs 424 and 426 of the respective relays 410 and 418 are connected to the Q output 428 of one-shot 202. Whenever Q output 428 of one-shot 202 is in the logic 1 state, i.e., when gated oscillator 20 is activated, the signals appearing on outputs 12 and 14 of demodulator 302 are applied to analog input 404 of sample-and-hold circuit 406 and analog input 412 of sample-and-hold circuit 414, respectively. The analog inputs of sample-and-hold circuits 406 and 414 are at ground potential whenever gated oscillator 20 is deactivated. Each of two networks including resistor 430 of 100 ohms, resistor 432 of 3 kilohms, capacitor 434 of 330 pf, and capacitor 436 of 0.1 $\mu f$ is positioned between B-Y output 12 of demodulator 302 and input 404 of sample-and-hold circuit 406 and between R-Y output 14 of demodulator 302 and input 412 of sample-and-hold circuit 414. Each of these networks AC couples an output of demodulator circuit 302 to the analog input of the sample-and-hold circuit with which it is associated and permits the connection of such analog input to ground without destroying the output circuitry of demodulator 302. Resistor 430 and capacitor 434 form a low pass filter for the B-Y and R-Y outputs.

In response to a trigger pulse, one-shot 202 provides at its Q output 428 a signal in the logic 1 state that is applied to control inputs 424 and 426 of respective relays 410 and 418 to drive them into the open or nonconducting state. This causes the B-Y signal to be delivered to analog input 404 of sample-and-hold circuit 406 and the R-Y signal to be delivered to analog input 412 of sample-and-hold circuit 414. Simultaneously, a source phase sample signal is provided on output 440 of timing subcircuit 78 and applied to enable input 442 of sample-and-hold circuit 406, and a source frame sample signal is provided on output 444 of timing subcircuit 78 and applied to enable input 446 of sample-and-hold circuit 414. The source phase sample signal enables sample-and-hold circuit 406 and the source frame sample signal enables sample-and-hold circuit 414 during each time the color video source signal is transmitted by multiplexer 58 and the synchronization tip and back porch portions of the color video source signal are transmitted by multiplexer 92. This sampling procedure is carried out for a number of horizontal synchronization pulses throughout a color field, thereby to provide an indication of a change in the phase between the color synchronization burst signal and the horizontal synchronization pulse. In particular, phase samples and frame samples are acquired for odd numbered lines of field 2 and even numbered lines of field 4 of the four color field sequence (i.e. color frame 1 and color frame 2, respectively). The sampled voltage of the B-Y signal provided on the output 448 of sample-and-hold circuit 406 is used to determine the phase angle between the color synchronization burst signal and horizontal synchronization pulse for one line of the color video source signal. The sampled voltage of the R-Y signal provided on the output 450 of sample-and-hold circuit 414 is used to determine whether the color frame sequences of the color video source and reference signals are matched. This latter signal undergoes further processing as described below.

The R-Y signal on output 14 of demodulator 302 is also delivered under the control of relay 418 to the analog input 451 of a sample-and-hold circuit 452. During the time when multiplexers 58 and 92 transmit the color video reference signal and Q output 428 of one-shot 202 provides a signal in the logic 1 state in response to a trigger pulse, relay 418 is in the nonconducting state, thereby removing contact 416 from ground and permitting the delivery of the R-Y signal to input 451 of sample-and-hold circuit 452. Simultaneously, a reference frame sample signal provided on output 454 of timing subcircuit 82 and applied to the enable input 456 of sample-and-hold circuit 452 causes the sampling of the R-Y signal voltage during that time. The sampling procedure for the reference signal is analogous to that of the video source signal as described above, with the exception that no phase samples are acquired and frame samples are acquired for even numbered lines of field 1 and odd numbered lines of field 3 (i.e. color frame 1 and color frame 2, respectively) of the four color field sequence. The sampled R-Y signal voltage appears on output 458 of sample-and-hold circuit 452. The sampled R-Y signal voltages of the video source signal and the video reference signal are compared by a color frame detector circuit 460 to determine whether there is a color frame mismatch between the video source signal and the video reference signal.

Color frame detector circuit 460 comprises two similar comparator subcircuits, each including a voltage follower amplifier and a Schmitt trigger comparator connected in cascade and receiving the output of a different one of sample-and-hold circuits 414 and 452. Corresponding components of the comparator subcircuits have identical reference numerals with different suffixes, the suffix "a" and the suffix "b" representing the comparator subcircuits for the source frame voltage sample and the reference frame voltage sample, respectively. The following description is directed only to the comparator subcircuit for the source frame voltage sample.

The voltage follower amplifier comprises an operational amplifier 462a whose output 464a is connected to its inverting input 466a and whose noninverting input 468a receives the sampled voltage of the R-Y signal from output 450 of sample-and-hold circuit 414. A low pass filter comprising a resistor 470a of 4.7 kilohms and a capacitor 472a of 0.01 $\mu f$ removes high-frequency switching transient voltages before the signal passes through amplifier 462a. The output 464a of amplifier 462a is applied to the inverting input 474a of an operational amplifier 476a, whose output 478a is fed back to its noninverting input 480a through a resistor 482a of 75 kilohms. Noninverting input 480a of amplifier 476a is also connected through a resistor 484a of 4.7 kilohms to a comparison voltage, $V_c$, of 0.15 volt to form the Schmitt trigger. The comparator voltage $V_c$ is developed at the circuit node of a resistor 486 of 150 ohms and a resistor 488 of 12 kilohms, which are connected in series between a +12 volt supply and ground to form a voltage divider. A sampled voltage of the R-Y signal that is greater than $V_c$ causes amplifier 476a to provide on its output 478a a signal in the logic 0 state. Output 478a of amplifier 476a is in the logic 1 state at all other times.

Color frame detection circuit 460 takes the sampled R-Y signal voltages for the video source signal and the reference source signal and compares them. The comparison is accomplished by applying the outputs 478a and 478b of amplifiers 476a and 476b to different inputs of an EXCLUSIVE-OR gate 490. Output 492 of EXCLUSIVE-OR 490 is in the logic 0 state whenever the logic states of the signals applied to its inputs are the same, thereby indicating no frame error. To provide for the sampling of the correct line and field, the source frame output 478a of amplifier 476a is applied to an input 494 of timing subcircuit 78 and the reference frame output 478b of amplifier 476b is applied to an input 496 of timing subcircuit 82. The logic 1 state on outputs 478a and 478b indicates that the frame samples for the source and reference signals, respectively, correspond to the correct lines and fields (i.e., frames). The logic 0 state indicates that the frame samples do not correspond to the correct lines and fields (i.e., frames). Accordingly, timing circuits 78 and 82 maintain and change their timing signals in response to a logic state 1 and a logic state 0, respectively.

During the detection of color frame mismatching, reference timing subcircuit 82 generates reference sampling signals that maintain a logic 1 state at output 478b. These reference sampling signals correspond, therefore, to even numbered lines of field 1 and odd numbered lines of field 3 of the video reference signal. The reference sampling signals are applied via outputs 84 and 86 to source timing subcircuit 78, which generates source sampling signals that are defined with respect to the reference sampling signals. As a result, the source frame samples cause amplifier 476a to generate the logic state 1 and the logic 0 state in accordance with the color frames of the video reference signal and video source signal being matched and unmatched, respectively. During the measurement of the phase between the color synchronization burst signal and the horizontal synchronization pulse, source timing subcircuit 78 generates source sampling signals that maintain a logic state 1 at output 478a. These source sampling signals correspond, therefore, to odd numbered lines of field 2 and even numbered lines of field 4 of the video source signal. The logic state on output 478b does not affect the sampling for the phase measurement.

The source frame signal allows timing subcircuit 78 to internally generate timing signals corresponding to the four-color field sequence of the color video source signal. The four-color field sequence timing signals are employed in determining the timing of the source phase sample signal and the source frame sample signal on the respective outputs 440 and 444 of timing subcircuit 78. Timing subcircuit 78 also compares the four-color field sequence timing signals with the signals corresponding to the color frame and color field of the color video reference signal. Whenever it detects a difference between the color field sequences of the color video source and reference signals, timing subcircuit 78 provides at an output 498 a frame mismatch signal in the logic 1 state indicating a frame sequence mismatch. The reference frame signal allows timing subcircuit 82 to generate timing signals corresponding to the four-color field sequence of the color video reference signal. These timing signals are employed in determining the timing of the reference frame sample signal on output 454 of timing subcircuit 82.

It will be appreciated that phase detector 10 can be used to provide an indication of a color frame mismatch between different video source signals that are, for example, to be multiplexed on a VTR. The color frame sequence of each video source signal is separately measured and compared with that of the video reference signal in the manner described above. These comparisons provide information relating to color frame sequences of the video source signals relative to the color frame sequence of the video reference signal and, therefore, provide an indication of the synchronization between the color frame sequences of the video source signals. Moreover, using phase detector 10 in accordance with the above procedure makes possible a determination of whether the color frame sequences of multiple video source signals are matched without requiring matched timing of the signals.

The B-Y signal on output 448 of sample-and-hold circuit 406 and the source frame and the reference frame comparison signal on output 492 of EXCLUSIVE-OR gate 490 are processed by a display generator circuit 500 to provide on a television-type monitor a visual display image indicating the amount of phase error, if any, and the existence of a frame error.

The B-Y signal on output 448 of sample-and-hold circuit 406 is conditioned by a low pass filter, which is comprised of a resistor 470c and a capacitor 472c, and a voltage follower amplifier 462c as described with reference to the devices with corresponding reference numerals in color frame detection circuit 460. The B-Y signal on output 464c of voltage follower amplifier 462c is conditioned by an operational amplifier 502, whose output 504 is summed with the output 506 of a 20 KHz sine wave oscillator 508 at a Y-axis output terminal 509 to drive the Y-axis deflection coil of a cathode-ray tube (not shown). A potentiometer 510 connected to the noninverting input 512 of amplifier 502 sets the DC voltage offset of the B-Y signal. Resistor 514 of 1.0 kilohm connected between output 504 and inverting input 516 of amplifier 502, together with variable resistor 518 of 4.25 kilohms total resistance, sets the amplitude of the B-Y signal. The 20 KHz signal developed on output 506 of oscillator 508 is of relatively small amplitude, is AC coupled through a capacitor 520 of 0.1 $\mu f$, and is applied to the conditioned B-Y signal to provide Y-axis (i.e., vertical) modulation.

The control input 522 of a "normally closed" electronic relay 524 positioned between output 506 of oscillator 508 and capacitor 520 receives a 1 Hz signal that intensity modulates the Y-axis display whenever a color frame error is detected, as will be described below. Resistors 526 and 528, each of 100 ohms, comprise the summing network for the conditioned B-Y signal and the 20 KHz signal.

The B-Y signal on output 464c of voltage follower amplifier 462c is also applied to the control input 530 of a variable attenuator 532 whose output 534 is summed with the output 536 of a 100 KHz oscillator 538. Variable attenuator 532 receives on its signal input 540 the 20 KHz signal that is developed on output 506 of oscillator 508 and is AC coupled by a capacitor 542 of 0.1 $\mu f$, and attenuates the 20 KHz signal by an amount that is inversely proportional to the amplitude of the B-Y signal applied to control input 530. Output 534 of variable attenuator 532 is AC coupled through a capacitor 544 of 0.1 μf and a load resistor 546 of 12 kilohms to an operational amplifier 502′, which conditions the attenuated B-Y signal in the manner described above with reference to amplifier 502 and its associated components having identical reference numerals followed by primes.

The 20 KHz signal whose amplitude is directly related to the amount of Y-axis error is applied to an X-axis output terminal 548 to drive the X-axis deflection coil of the cathode-ray tube. As the amplitude of the B-Y (i.e., Y-axis) signal increases the X-axis horizontal modulation increases, thereby causing the length of a line trace on the display to increase in the horizontal direction as the phase error increases. The 100 KHz signal "fills in" the resultant box produced on the display as will be described with reference to FIG. 4. The control input 522′ of a normally closed relay 524′ positioned between output 536 of 100 KHz oscillator 538 and capacitor 520′ receives the 1 Hz signal that also intensity modulates the X-axis display.

A color frame error flasher 550 includes an oscillator 552 that develops on its output 554 a 1 Hz square wave signal that is delivered to the output 556 of a relay 558 to control inputs 522 and 522′ of respective relays 524 and 524′ whenever the color frames of the video source signal and the video reference signal are mismatched. This is accomplished by the presence of a signal in the logic 1 state at the output 560 of an OR gate 562, which is connected to the control input 564 of relay 558 and whose inputs receive the signal on output 492 of EXCLUSIVE-OR gate 490 and the frame mismatch signal developed on output 498 of timing subcircuit 78. OR gate 562 provides, therefore, a frame mismatch signal which depends upon an actual matching of the color frames of the video source signal and the video reference signal, rather than the detection of a threshold phase difference between the two signals.

Figure 4A:
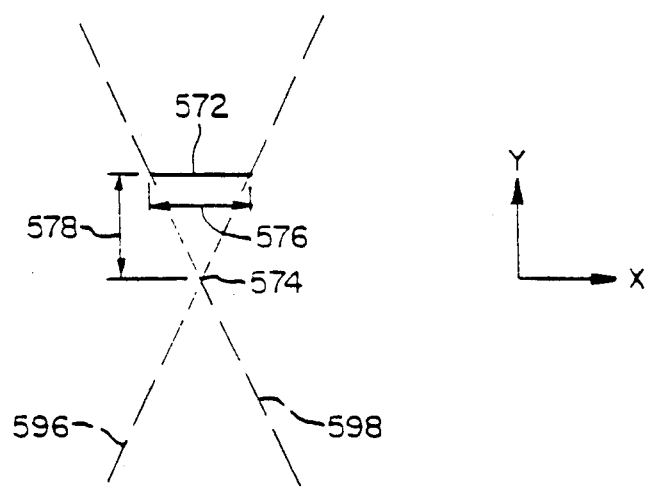
FIG. 4A is a diagram showing a preferred display image for indicating the phase angle between the color synchronization burst signal and a pair of successive horizontal synchronization pulses.

FIG. 4A shows an exemplary visual display image 572 that would be generated on a display screen of an X-Y monitor by the signals developed by display generation circuit 500 and applied to X-axis and Y-axis inputs of the monitor. A selected reference location 574 on the display screen of the X-Y monitor corresponds to a 0° phase angle between the color synchronization burst signal and the color synchronization pulse of the color video source signal. The 20 KHz signal applied to the X-axis input of the X-Y monitor generates image 572, which preferably comprises a horizontal straight line having a length 576 which is directly proportional to the amplitude of the B-Y signal provided on output 464c of amplifier 462c. The amplitude of the B-Y signal is, however, a sinusoidal function of the phase angle error between the color burst subcarrier signal and the horizontal synchronization pulse. The DC output voltage applied to the Y-axis input of the X-Y monitor displaces image or line 572 from reference location 574 by a distance 578. Distance 578 is proportional to a sinusoidal function of the phase angle error between the color burst subcarrier signal and the horizontal synchronization pulse.

The values of potentiometers 510 and 510′ set the X-Y coordinates of reference location 574 on the display screen. The coordinates are preferably set to offset reference location 574 from the image corresponding to the color video signal to prevent viewer confusion of the video signal image and line image. The values of variable resistors 518 and 518′ set the gains of the respective amplifiers 502 and 502′ and thereby determine the maximum length of line 572 and the maximum extent of distance 578.

Figure 4B:
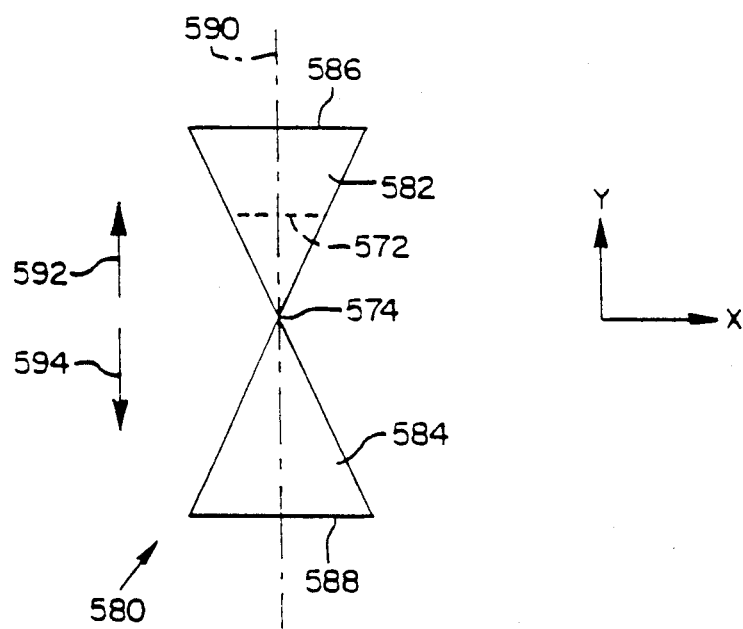
FIG. 4B is a diagram showing the composite outline of the preferred display images formed for all phase angles specified above for FIG. 4A.

FIG. 4B shows that the display of line 572 for all angles of the phase angle error function would describe a composite image 580 of generally hour glass shape, i.e., including a pair of isosceles triangles 582 and 584 with a common vertex 574 (i.e., the reference location) located opposite the base 586 of triangle 582 and the base 588 of triangle 584, the bases being parallel to each other and being bisected by a vertical axis 590 passing through reference location 574. The phase error function has a maximum horizontal extent at a maximum vertical position and a progressively decreasing horizontal extent as the vertical distance between line 572 (an exemplary line 572 is shown in phantom in FIG. 4B) and reference location 574 decreases as a function of decreasing phase angle error. The horizontal dimension increases with increasing vertical distance from reference location 574 in both the positive direction 592 and the negative direction 594, one direction corresponding to a phase lead and the other direction corresponding to a phase lag.

In FIG. 4A, broken lines 596 and 598 indicate the extent of line 572 as a function of the vertical distance from reference location 574. The presence of a color frame mismatch enables the 100 KHz oscillator which modulates the X-axis output to "fill in" the triangular region between reference location 574 and line 572 and enclosed by broken lines 596 and 598. A color frame mismatch also causes the entire display image to flash at a 1 Hz rate.

It will be appreciated that phase detector 10 minimizes the effect of time jitter between successive horizontal scan lines through the use of sample-and-hold circuits 130, 132, 406, 414, and 452. The effect of such time jitter is also avoided because the sample time between a horizontal synchronization pulse and a color synchronization burst signal for a particular scan line is independent of that of any other scan line.

Figure 5A:
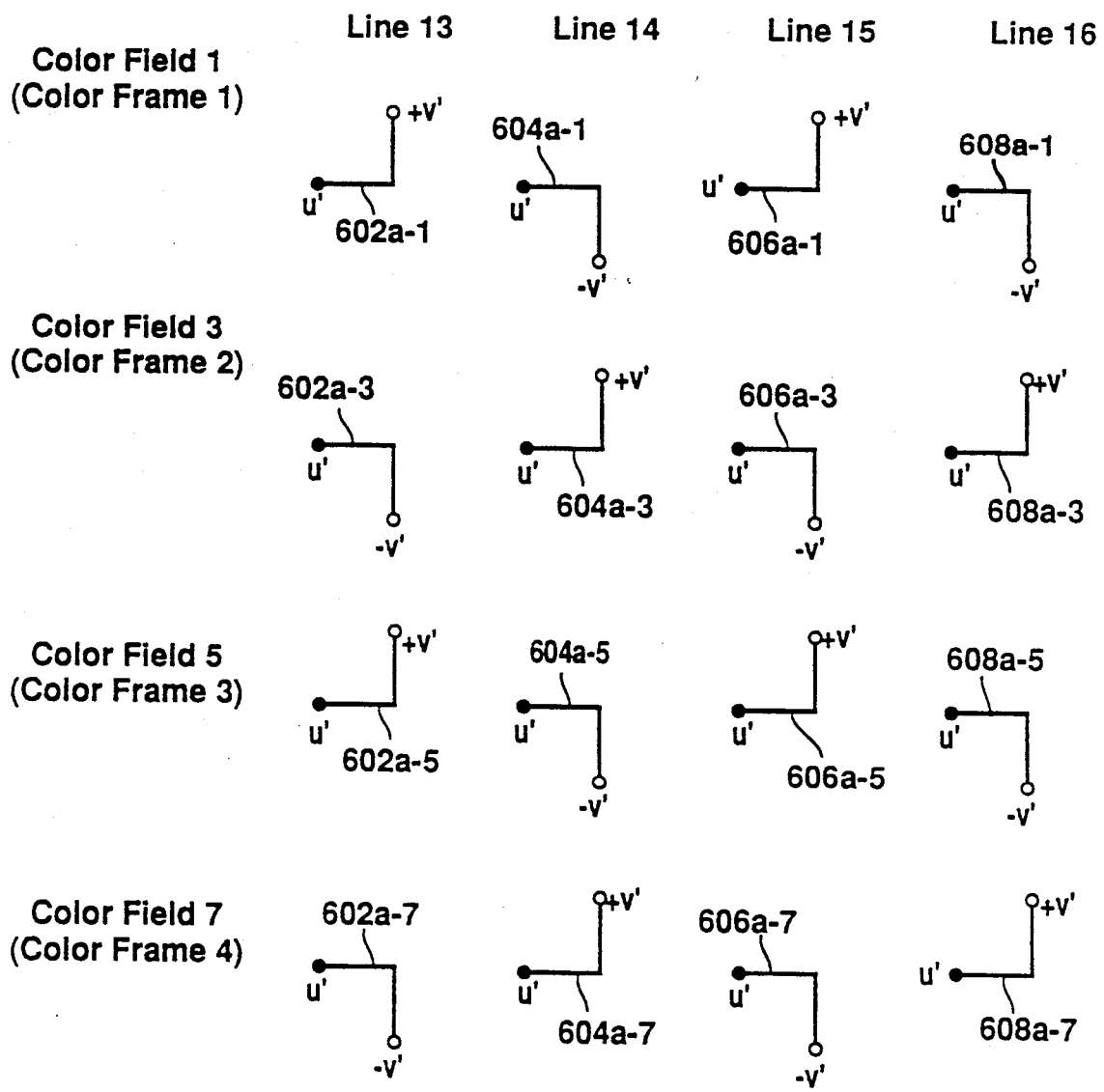
FIGS. 5A and 5B show vector representations of U and V encoding signals generated by the phase detector circuit of FIGS. 3A and 3B in accordance with a PAL-based color video signal.
Figure 5B:
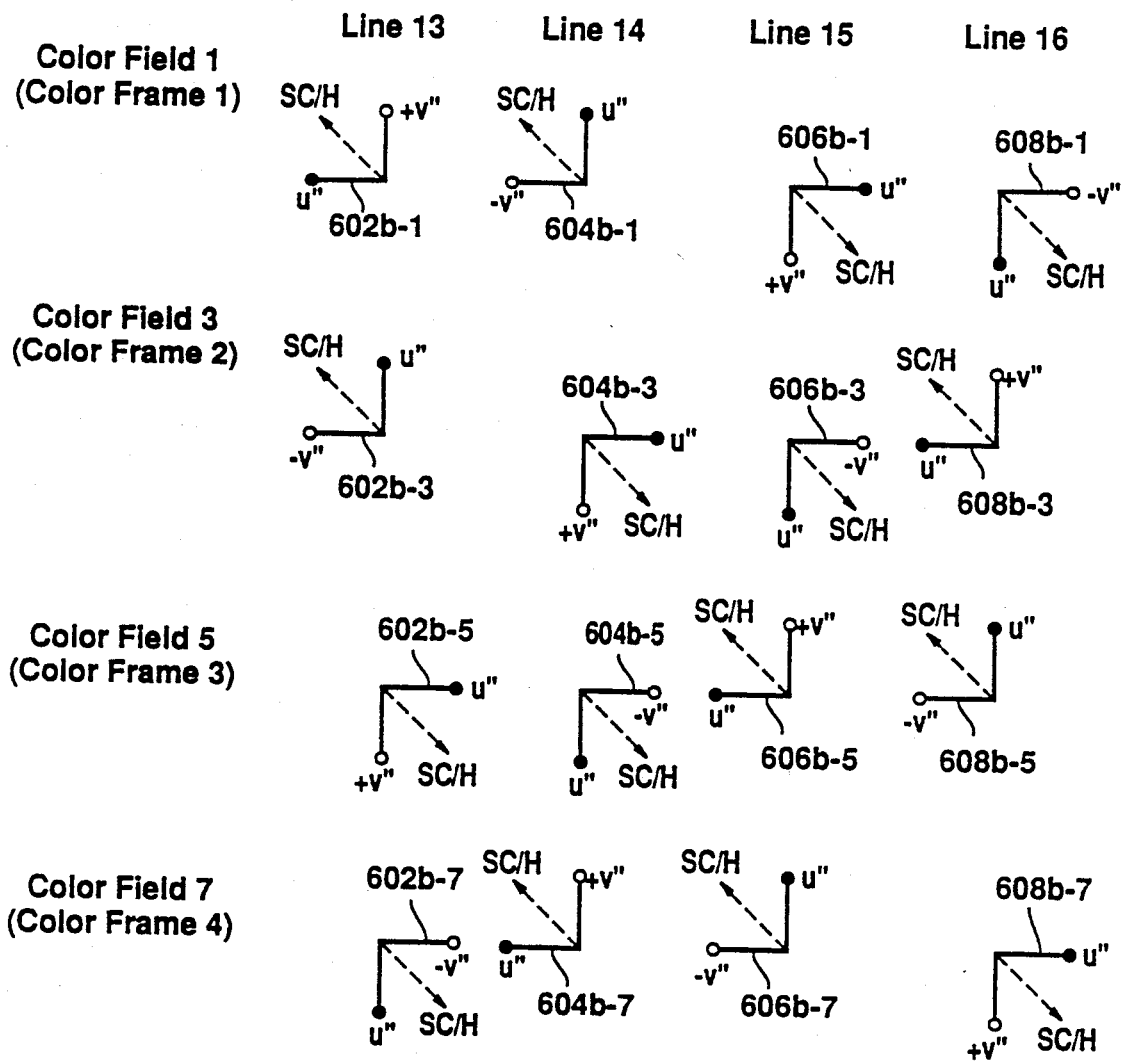
Figure 6:
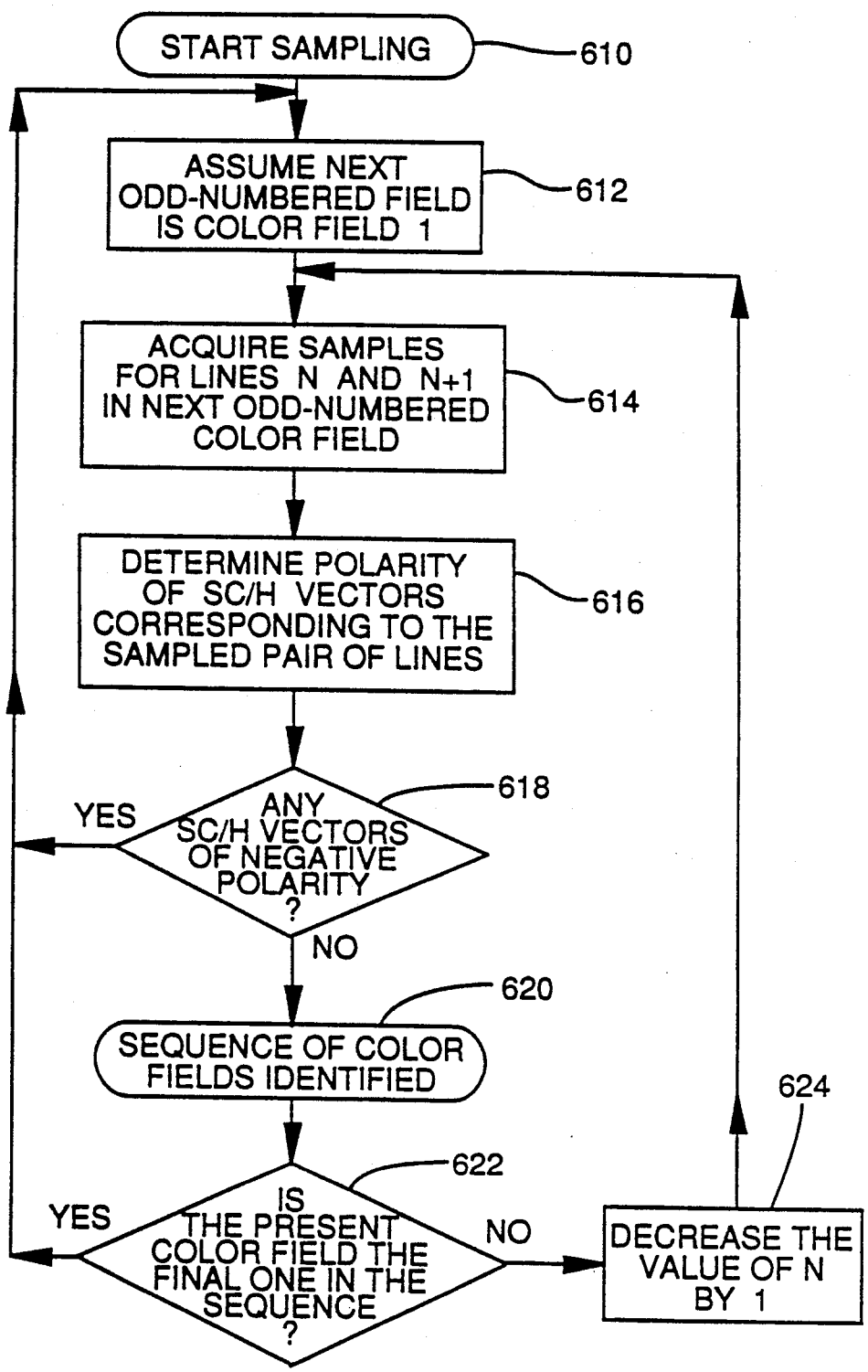
FIG. 6 is a flow diagram representing a method by which the phase detector circuit of FIGS. 3A and 3B acquires samples of a PAL-based color video signal.

FIGS. 5a, 5B, and 6 together with the following description are directed to employing color video signal phase detector 10 to measure the phase characteristics of a PAL-based color video signal. In particular, FIGS. 5a, 5b, and 6 are directed to a method of sampling a PAL-based color video signal to measure the phase angle between the color synchronization burst signal and the horizontal synchronization pulse train (the "SC/H phase angle") and to determine whether the color frame sequence of a video source signal matches that of a video reference signal. The circuit components included in phase detector 10 to measure a PAL-based signal are substantially similar to those employed in the measurement of an NTSC-based signal, as described below in greater detail.

Signals comparable to the B-Y and R-Y signals in an NTSC-based system are referred to as U and V encoding signals, respectfully, in a PAL-based system. The U and V encoding signals are similar to the B-Y and R-Y signals in being proportional to the respective sine and cosine of the phase angle between the horizontal synchronization pulse train and the color subcarrier signal. Phase detector 10 provides the U and V encoding signals at respective outputs 12 and 14 in a manner similar to that in which the B-Y and R-Y signals are generated in an NTSC-based system. It will be appreciated, however, that oscillator circuit 20 in a PAL-based system would be configured to generate a reference subcarrier signal of about 4.43 MHz, which is the standard color subcarrier signal frequency in a PAL-based video signal.

PAL-based systems employ a four-color frame (i.e., eight-color field) sequence of phase angles between the color subcarrier signal and the horizontal synchronization pulse train. In addition, PAL-based systems employ an inverted color subcarrier signal in the generation of the V encoding signal for alternate ones of the horizontal scan lines (i.e., phase alternate lines).

With reference to the PAL systems designated G, B, H, and I, for example, the frequency of the horizontal synchronization pulse train $f_h$ is established at 15.625 kHz and the frequency of the color subcarrier signal $f_{sc}$ is related to it as:

$$f_{sc} = (1135/4 + 1/625)f_h.$$

The factor 1135/4 establishes a primary color subcarrier component having 283.75 cycles for each horizontal scan line. The factor 1/625 establish a secondary color subcarrier component having a frequency of 25 Hz, which corresponds to the frequency at which color frames are rendered. (Each color frame in a PAL-based system includes 625 horizontal scan lines.) The secondary color subcarrier component causes the SC/H phase angle to change 0.576° (i.e., 360°/625) for successive lines in a color frame.

FIG. 5a shows simplified vector representations of the U and V encoding signals provided at respective outputs 12 and 14 of phase detector 10. The simplified vector representations in FIG. 5a correspond, for example, to the thirteenth, fourteenth, fifteenth, and sixteenth lines (i.e., the odd-numbered lines 13, 14, 15, and 16) in each of the first, third, fifth, and seventh color fields (i.e., the odd-numbered color fields 1, 3, 5, and 7) of the PAL eight-color field sequence. Each of the simplified vector representations is identified by the suffix "a". The vector representations of corresponding lines in different color fields are identified by identical reference numerals with numerical suffixes corresponding to the number of the color field.

The vector representations of FIG. 5a show the change in the polarity of the V encoding signal caused by employing an inverted color subcarrier signal for alternate successive horizontal lines. The vector representations of FIG. 5a are simplified in that they do not show the 25 Hz secondary component of the color subcarrier signal or the phase shifts introduced between successive horizontal lines by the non-integral relationship between the frequencies of the main color subcarrier component and the horizontal synchronization pulse train.

The phase relationships between the U and V encoder signals for lines 13, 14, 15, and 16 of color field 1 are indicated by vector representations 602a-1, 604a-1, 606a-1, and 608a-1, respectively. Vector representations 602a-1, 604a-1, 606a-1, and 608a-1 include vectors u' and v' that represent the relative phases of the respective U and V encoding signals. The polarity of the vector v' is inverted for alternate ones of the successive lines 13, 14, 15, and 16 and is indicative of the inverted color subcarrier signal employed for the V encoding signal for the alternate lines. The polarity of the vector u' is substantially the same for each of the lines 13, 14, 15, and 16 and is indicative of the constant color subcarrier signal employed for the U encoding signal for each of the lines. The u' and v' vectors are separated by angles of 90° in each of the vector representations to represent the 90° phase difference between the sine signal corresponding to the U encoding signal and the cosine signal corresponding to the V encoding signal. The description set forth above with reference to the vector representations for color field 1 is applicable to the vector representations for each of the color fields 3, 5, and 7.

The phase angle of the V encoding signal in corresponding lines of successive color frames is shifted by an angle of 180°. This 180° phase shift is demonstrated, for example, by the v' vector for line 13 in vector representations 602a-1 and 602a-3 of color fields 1 and 3, respectively. The 180° phase shift is a result of the color subcarrier signal being inverted for alternate ones of an odd number of horizontal lines (i.e., 625) in each color frame.

FIG. 5b shows vector representations that correspond to those shown in FIG. 5a and that include the phase shifts introduced between successive horizontal lines by the non-integral relationship between the frequencies of the main color subcarrier component and the horizontal synchronization pulse train. The vector representations of FIGS. 5a and 5b corresponding to the same horizontal lines and color fields are identified by identical reference numerals with the suffixes "a" and "b", respectively.

With reference to FIG. 5b, the phase relationships between the U and V encoder signals for lines 13, 14, 15, and 16 of color field 1 are indicated by vector representations 602b-1, 604b-1, 606b-1, and 608b-1, respectively. Vector representations 602b-1, 604b-1, 606b-1, and 608b-1 include vectors u" and v" that represent the relative phases of the U and V encoding signals, respectively.

With reference to FIGS. 5a and 5b, line 13 of color field 1 is arbitrarily designated a reference line from which the SC/H phase angles (i.e., the phase angles between the color subcarrier signal and the horizontal synchronization pulse train) for subsequent lines and fields are determined. As a result, vector representations 602a-1 and 602b-1 are identical. Vector representation 602b-1 includes an SC/H vector representing the phase angle between the color subcarrier signal and the horizontal synchronization pulse train. The SC/H vector represents the vector sum of the u" and v" vectors.

Vector representations 604b-1, 606b-1, and 608b-1 in FIG. 5b show a 90° phase shift introduced into the phase representations (i.e., the u" and v" vectors) of each successive line by the non-integral relationship between the frequencies of the horizontal synchronization pulse train and the main component of the color subcarrier signal. Set forth below is a description of how the 90° phase shifts are introduced by the 0.75 cycle portion of the 283.75 cycles of main color subcarrier component for each horizontal line.

The U encoding signal represents the sine of the difference between the phase angle of the color subcarrier signal and the reference subcarrier signal, which is triggered from a horizontal synchronization pulse. Whenever the phase angle of the color subcarrier signal is subtracted from the phase angle of the reference subcarrier signal, the 0.75 cycle change in the color subcarrier signal for successive horizontal lines represents a −270° change in the phase angle of the color subcarrier signal. With respect to the sine function, a −270° phase shift is equivalent to and may be represented as a +90° phase shift. As a result, the angle of the u" vector is rotated by an angle of 90° for each successive horizontal line as shown, for example, in lines 13-16 of color field 1. In each vector representation, the v″ vector is offset from the u″ vector by an angle of 90°. The 90 relationship between the u″ and v″ vectors for each line is the same as the 90° relationship between the u″ and v″ vectors for corresponding lines.

The SC/H vectors in each of the vector representations in FIG. 5b are designated as having positive and negative polarities in accordance with the direction in which the vector is oriented. An SC/H vector having an orientation similar to that of the SC/H vector in representation 602b-1 is designated as having a positive polarity. An SC/H vector having an orientation similar to that of the SC/H vector in representations 606b-1 is designated as having a negative polarity.

Table 1 shows the polarities of the SC/H vectors for lines 13-23 in each of the color fields 1, 3, 5, and 7 (i.e., color frames 1, 2, 3, and 4). As shown in Table 1, the polarity of the SC/H vector is inverted for successive pairs of adjacent lines in each color frame. Since each color frame includes 625 horizontal lines, however, the polarity of the SC/H vector is inverted for different successive pairs of adjacent lines in each successive color frame. As a result, the polarity of the SC/H vector for each line is different for different ones of the color frames in the four-color frame sequence.

In connection with an NTSC-based system, phase detector 10 acquires phase and frame samples for a video source signal on odd-numbered lines of field 2 and even numbered lines of field 4, respectively. As described with reference to the NTSC-based system, the sampling of video signals is controlled by timing signals generated by timing subcircuit 70. The phase relationship between the color subcarrier signal and the horizontal synchronization pulse train in an NTSC-based video signal allows such a signal to be sampled, for example, on any of the odd-numbered lines within color field 2. Such a sampling technique is, however, incompatible with a PAL-based video signal.

TABLE 1

|  | Line Numbers | | | | | |
| --- | --- | --- | --- | --- | --- | --- |
|  | 13 | 15 | 17 | 19 | 21 | 23 |
| Color Field 1 (Color Frame 1) | + | + | − | − | + | + | − | − | + | + | − |
| Color Field 3 (Color Frame 2) | + | − | − | + | + | − | − | + | + | − | − |
| Color Field 5 (Color Frame 3) | − | − | + | + | − | − | + | + | − | − | + |
| Color Field 7 (Color Frame 4) | − | + | + | − | − | + | + | − | − | + | + |

With reference to Table 1, the polarity of the SC/H vector for successive odd-numbered lines alternates in each one of the color fields. As a result, the measurement of the phase characteristics of a PAL-based video signal requires an alternative method of operating timing subcircuit 70.

In connection with a PAL-based system, the operation of timing circuit 70 is adapted to provide sampling of a video signal such that the polarity of the SC/H vector for each sample is the same. For example, timing circuit 70 could be adapted to sample lines 17 and 18 in field 1, lines 16 and 17 in field 3, lines 15 and 16 in field 5, and lines 14 and 15 in field 7. As shown in Table 1, each of the sampled lines would generate an SC/H vector having a positive polarity.

With reference to the sampling of the color video source signal, for example, timing subcircuit 78 identifies the lines to be sampled in accordance with the logic state of the source frame signal that amplifier 476a delivers to input 494 of timing subcircuit 78. As in the NTSC-based system, subcircuit 78 generates source sampling signals for color frames that are defined with respect to the reference sampling signals and specific lines that are defined with respect to the source timing signals. Timing subcircuit 78 is capable of distinguishing between odd- and even-numbered fields in the eight-color field sequence and is capable of identifying specific lines within a color field.

In addition to the determination of the SC/H phase angle for a PAL-based color video source signal, the method of the present invention also allows phase detector 10 to determine whether the color frame sequence of a PAL-based PAL-based color video source signal is matched to that of a color video reference signal. Phase detector 10 provides detection of color frame mismatching between PAL-based color video source and reference signals in a manner similar to that set forth above with reference to an NTSC-based system. In particular, multiplexer 58 of phase detector 10 allows PAL-based color video source and reference signals to be processed in alternation for color frame mismatch detection.

FIG. 6 is a flow diagram of the method by which phase detector 10 acquires samples of a PAL-based video signal. The flow diagram of FIG. 6 is described with reference to the exemplary sample lines set forth above.

Process block 610 represents the start of the sampling of PAL-based signal by phase detector 10.

Process block 612 indicates that subcircuit 78 "assumes" that the next odd-numbered color field corresponds to color field 1 in the eight-color field sequence. As a result, phase detector 10 processes the next odd-numbered color field as if it were color field 1.

Process block 614 indicates that timing subcircuit 78 generates control signals in response to which phase detector 10 acquires phase samples for lines numbered N and N+1 (e.g., lines 17 and 18) of the next odd-numbered color field.

Process block 616 indicates that phase detector 10 determines the polarity of the SC/H vectors corresponding to the sampled pair of lines. In particular, the polarities of the SC/H vectors are represented by the logic state of the reference frame signal that is generated at output 478b of amplifier 476b. Since the phase angle of the reference signal is assumed to be 0° and the U encoding signal is proportional to the sine function, the u″ vector corresponding to a reference frame sample has a zero value. The polarity of the V encoding signal (i.e., the v″ vector) represented by the logic state of the reference frame signal generated at output 478b is, therefore, indicative of the polarity of the SC/H vector.

Decision block 618 represents an inquiry as to whether of the SC/H vectors for either of the lines 17 and 18 is of a negative polarity. Whenever the timing subcircuit 78 determines that the SC/H vector for at least one of the lines 17 and 18 is of a negative polarity, decision block 618 returns to process block 612. Whenever timing subcircuit 78 determines that the SC/H vectors for both of the lines 17 and 18 are of a positive polarity, decision block 618 proceeds to status block 620, which indicates that the eight-color field sequence has been identified.

Decision block 622 represents an inquiry as to whether the present color field is the final one in the eight-color field sequence. Whenever the present color field is the final one in the eight-color field sequence, decision block 622 returns to process block 612. Whenever the present color field is not the last one in the eight-color field sequence, decision block 622 proceeds to process block 624.

Process block 624 indicates that timing subcircuit 78 decreases by one the value of N, thereby to identify, for example, lines 16 and 17. Process block 624 returns to process block 614.

Figure 7A:
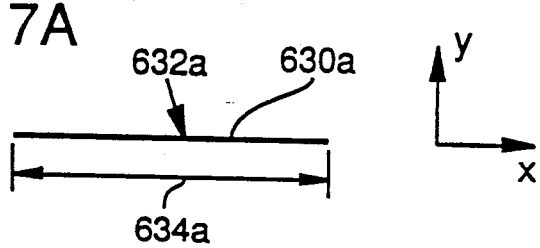
FIGS. 7A and 7B are diagrams of alternative display images for indicating the phase angles between the color synchronization burst signal and a horizontal synchronization pulse train.
Figure 7B:
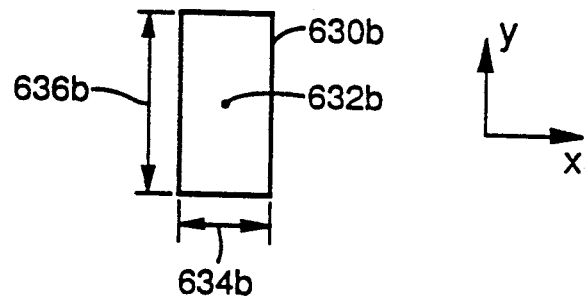

FIGS. 7A and 7B show respective first and second alternative visual display images 630a and 630b that could be generated on a display screen of an X-Y monitor in a manner similar to that in which visual display image 572 (FIG. 4A) is generated. With respect to FIGS. 7A and 7B, selected reference locations 632a and 632b on the display screen of the X-Y monitor correspond to the zero degree phase angle between the color synchronization burst signal and the horizontal synchronization pulse (i.e., the SC/H phase angle).

Image 630a comprises a horizontal straight line that is aligned with the X-axis on the X-Y monitor and that has a length 634a that is directly proportional to the amplitude of the signal provided at output 464c (FIG. 3B) of amplifier 462c (FIG. 3B). This signal corresponds to the B-Y and the U encoding signals in NTSC-based and PAL-based systems, respectively. Image 630a differs from image 572 (FIG. 4A) in that the former is fixed at its corresponding reference location 632a. In addition, image 630a may be rendered with a light intensity that is proportional to the SC/H phase angle.

Image 630b comprises a geometric shape in the form of a rectangle having lengths 634b and 636b along the respective X- and Y-axes on the X-Y monitor. Although the lengths 634b and 636b of image 630b could both be proportional to the amplitude of the signal provided at output 464c (FIG. 3b) of amplifier 462c (FIG. 3b), image 630b is described such that length 636b is proportional to this signal and length 634b is fixed. Image 630b is similar to image 630a in that the former may be rendered with a light intensity that is proportional to the SC/H phase angle. It will be appreciated that image 630b could be implemented as a geometric shape other than a rectangle such as, for example, a diamond, a triangle, or a circle.

In a preferred embodiment, the lengths 634a and 636b of respective images 630a and 630b are proportional to sinusoidal functions of the SC/H phase angle. Rendering the size of images 630a and 630b in accordance with a sinusoidal function of the SC/H phase angle provides an image that increases in size as the phase error increases. As a result, images 630a and 630b are more likely to be noticed by an observer as the magnitude of the SC/H phase angle increases. In addition, rendering images 630a and 630b with light intensities that are proportional to the SC/H phase angle also makes the images more likely to be noticed by an observer.

The sine function has a slope which is at a maximum value for phase angles of zero degrees. As a result, changes in a phase angle that is in the vicinity of zero degrees cause comparatively large changes in the lengths 634a and 636b of images 630a and 630b, respectively. Such characteristics of images 630a and 630b aid an observer in distinguishing relatively small changes in phase angles that are in the vicinity of zero degrees. Although described with reference to the sine function, other functions having a slope that is a maximum in the vicinity of zero degrees would provide the display benefits of the present invention.

To provide an observer an indication of a color frame mismatch, image 572 (FIG. 4a) was "flashed". Such "flashing" represented a time-dependent variation in the character of image 572. In connection with images 630a and 630b, a color frame mismatch may be represented as a time-dependent variation of the intensity (i.e., "flashing"), the size, or the location of images 630a and 630b. Such time-dependent variations in images 630a and 630b are relatively distinctive and provide, therefore, a noticeable warning to an observer of a color frame mismatch.

It will be obvious to those having skill in the art that many changes may be made to the details of the above-described preferred embodiment of the present invention without departing from the underlying principles thereof. The scope of the present invention should be determined, therefore, only by the following claims.

I claim:

1. In a system that measures the phase angle between the horizontal synchronization pulse and the color synchronization burst signal of a color video signal, a method of displaying the value of the phase angle on a video monitor display screen, comprising:

selecting on the display screen of the video monitor an image location at which the value of the phase angle is displayed; and forming on the display screen an image that has a length along a first axis passing through the image location and that has a light intensity, the length and the light intensity being proportional to the value of the phase angle.

2. The method of claim 1 in which one of the length and the light intensity is proportional to a first function of the phase angle, the first function has a slope, and the absolute value of the slope is a maximum when the phase angle is substantially equal to a preselected value, thereby to provide comparatively large changes in the image whenever the value of a phase angle in the vicinity of the preselected value change.

3. The method of claim 2 in which the preselected value of the phase angle is zero degrees.

4. The method of claim 2 in which the image further includes a length along a second axis transverse to the first axis and in which the length of the image along the first axis is proportional to the first function.

5. The method of claim 4 in which the image is of geometric shape.

6. The method of claim 4 in which the image is of rectangular shape.

7. The method of claim 1 in which the system is capable of detecting a mismatch between the color frame sequences of a color video source signal and a color video reference signal and in which the method further comprises providing a time-dependent variation in the length or light intensity of the image whenever a color frame mismatch is detected.

8. In a system that measures the phase angle between the horizontal synchronization pulse and the color synchronization burst signal of a color video signal, the system being capable of detecting a mismatch between the color frame sequences of a color video signal and a color video reference signal, a method of displaying the value of the phase angle on a video monitor display screen, comprising:

selecting on the display screen of the video monitor an image location at which the value of the phase angle is displayed;

forming on the display screen an image that has a length along a first axis passing through the image location and that has a light intensity, wherein one of the length or the light intensity is proportional to the value of the phase angle; and providing a time-dependent variation in the length or light intensity of the image whenever a color frame mismatch is detected.

9. The method of claim 8 in which the one of the length and the light intensity is proportional to a first function of the phase angle, the first function has a slope, and the absolute value of the slope is a maximum when the phase angle is substantially equal to a preselected value, thereby to provide comparatively large changes in the image whenever the value of a phase angle in the vicinity of the preselected value changes.

10. The method of claim 9 in which the preselected value of the phase angle is zero degrees.

11. The method of claim 9 in which the image further includes a length along a second axis transverse to the first axis and in which the length of the image along the first axis is proportional to the first function.

12. The method of claim 11 in which the image is of geometric shape.

13. The method of claim 11 in which the image is of rectangular shape.

* * * * *

UNITED STATES PATENT AND TRADEMARK OFFICE
CERTIFICATE OF CORRECTION

PATENT NO. : 5,057,910

DATED : October 15, 1991

INVENTOR(S) : John L. Judge

It is certified that error appears in the above-identified patent and that said Letters Patent is hereby corrected as shown below:

Column 4, line 66, change "*is*" to --is--.

Column 7, line 17, change "TL071C" to --TL071C--.

Column 19, line 3, change "90" to --90°--.

Column 19, line 30, change "even numbered" to --even-numbered--.

Column 20, line 15, change "PAL-based PAL-based" to --PAL-based--.

Signed and Sealed this

Twenty-third Day of February, 1993

Attest:

STEPHEN G. KUNIN

*Attesting Officer*     *Acting Commissioner of Patents and Trademarks*